(12) United States Patent
Weis (10) Patent No.: US 11,641,955 B2
(45) Date of Patent: *May 9, 2023

(54) PORTABLE ADVERTISING PLATFORMS

(71) Applicant: Roy John Weis, McMinnville, OR (US)

(72) Inventor: Roy John Weis, McMinnville, OR (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/388,633

(22) Filed: Jul. 29, 2021

(65) Prior Publication Data

US 2023/0035106 A1     Feb. 2, 2023

(51) Int. Cl.
| | | |
|---|---|---|
| *A47F 5/13* | (2006.01) |
| *A47F 5/01* | (2006.01) |
| *G09F 21/04* | (2006.01) |
| *G09F 7/18* | (2006.01) |
| *B62B 3/02* | (2006.01) |
| *B62B 3/10* | (2006.01) |
| *B62B 3/04* | (2006.01) |

(52) U.S. Cl.
CPC ............... *A47F 5/137* (2013.01); *A47F 5/01* (2013.01); *B62B 3/02* (2013.01); *B62B 3/04* (2013.01); *B62B 3/10* (2013.01); *G09F 7/18* (2013.01); *G09F 21/04* (2013.01); *B62B 2203/07* (2013.01); *B62B 2206/02* (2013.01); *B62B 2206/06* (2013.01); *G09F 2007/1865* (2013.01)

(58) Field of Classification Search
CPC ........ A47F 5/0081; A47F 5/108; A47F 5/137; A47F 5/14; A47F 5/0006; A47F 5/01; G09F 23/06; G09F 21/04; G09F 7/18; G09F 2007/1865; B62B 3/02; B62B 3/10; B62B 3/04; B62B 2206/06; B62B 2206/02

See application file for complete search history.

(56) References Cited

U.S. PATENT DOCUMENTS

| | | | | | |
|---|---|---|---|---|---|
| 2,720,414 | A | * | 10/1955 | Hart ...................... | B62D 33/08 224/403 |
| 2,749,071 | A | * | 6/1956 | Remstein ................ | F16B 12/40 248/172 |
| 2,805,776 | A | * | 9/1957 | Levitin .................... | A47F 7/30 248/172 |
| 2,885,090 | A | * | 5/1959 | Forman .................... | A47F 7/24 211/175 |

(Continued)

*Primary Examiner* — Devin K Barnett (57) ABSTRACT

A portable advertising platform system for store front, street side and indoor promotions. The platform can elevate signs and products above obstacles. Items are fastened at their tops only allowing them to freely swing; wind resistant. This rugged, lightweight platform is made from plastic or aluminum and consists of several joints interconnected by square shaped insert tubes; thumb screw fastening. Tubes can couple together to form longer members. Joints can rotate 90 degrees to create perpendicular branches. The platform consists of a lower cart with several vertical mounts, supporting an upper web with multiple tiers and overhanging arms. The platform can substantially stretch horizontally, vertically and in width providing numerous configurations. The 4 leg levelers telescope multiple feet both horizontally and vertically to level the cart on rough uneven terrain. Leg levelers also act as durable brakes; friction with ground. Detachable large 8 inch wheels swivel for easy maneuvering.

19 Claims, 5 Drawing Sheets

(56) References Cited

U.S. PATENT DOCUMENTS

| | | | | | |
|---|---|---|---|---|---|
| 2,950,015 | A | * | 8/1960 | Pataky | A47F 5/14 403/267 |
| 3,092,408 | A | * | 6/1963 | Berman | A47F 5/14 403/306 |
| 3,149,725 | A | * | 9/1964 | Magers | A47B 97/02 248/407 |
| 3,391,930 | A | * | 7/1968 | Weissman | A61H 3/04 482/68 |
| 3,462,021 | A | * | 8/1969 | Hawke | F16B 12/40 403/174 |
| 3,608,668 | A | * | 9/1971 | Mahaney | B66F 11/044 182/12 |
| 3,702,033 | A | * | 11/1972 | Coleman | G09F 21/04 280/415.1 |
| 3,812,836 | A | * | 5/1974 | Jackson | F24B 1/00 248/172 |
| 3,883,846 | A | * | 5/1975 | Bruner | E01F 9/70 40/550 |
| 3,955,511 | A | * | 5/1976 | Bak | A47B 45/00 248/172 |
| 4,054,209 | A | * | 10/1977 | Solomon | A47F 7/24 211/208 |
| 4,087,785 | A | * | 5/1978 | Dodich | B62D 63/064 362/153.1 |
| 4,427,379 | A | * | 1/1984 | Duran | C21D 9/0025 296/3 |
| 4,438,580 | A | * | 3/1984 | Yamaji | G09F 21/04 40/590 |
| 4,593,265 | A | * | 6/1986 | McKenney | E01F 9/662 40/550 |
| 4,608,773 | A | * | 9/1986 | White | G09F 15/0075 40/607.1 |
| 4,922,653 | A | * | 5/1990 | Stone | A01G 17/04 47/45 |
| 4,959,916 | A | * | 10/1990 | Cochrane | A47G 1/08 40/606.17 |
| 5,016,893 | A | * | 5/1991 | Hart, Jr. | F16B 12/32 211/195 |
| 5,033,758 | A | * | 7/1991 | Levy | B62B 3/02 248/419 |
| 5,040,808 | A | * | 8/1991 | McIntyre | B62B 1/18 D34/24 |
| 5,048,849 | A | * | 9/1991 | Mathews | B62B 3/10 D34/12 |
| 5,122,797 | A | * | 6/1992 | Wanasz | B60Q 7/00 340/908 |
| 5,143,415 | A | * | 9/1992 | Boudah | B60R 9/00 224/325 |
| 5,190,171 | A | * | 3/1993 | Christman, Jr. | A47B 87/0246 211/186 |
| 5,192,107 | A | * | 3/1993 | Smith, Sr. | B60P 3/40 296/3 |
| 5,249,823 | A | * | 10/1993 | McCoy | B62B 3/02 280/87.01 |
| 5,257,794 | A | * | 11/1993 | Nakamura | B62B 3/00 24/270 |
| D346,081 | S | * | 4/1994 | Turner | D6/681.1 |
| 5,326,337 | A | * | 7/1994 | Pardella | A63B 9/00 403/49 |
| D349,668 | S | * | 8/1994 | Mathews | D12/129 |
| 5,476,282 | A | * | 12/1995 | Dahl | B62B 1/002 280/651 |
| D365,716 | S | * | 1/1996 | Rose, Sr. | D6/552 |
| 5,484,150 | A | * | 1/1996 | Yasutomi | B62B 3/00 248/68.1 |
| 5,599,031 | A | * | 2/1997 | Hodges | B62B 5/0083 280/35 |
| 5,617,660 | A | * | 4/1997 | Pollack | G09F 15/0062 40/761 |
| 5,617,962 | A | * | 4/1997 | Chen | A47G 25/0664 211/206 |
| D384,464 | S | * | 9/1997 | Tonzillo | D34/12 |
| D384,979 | S | * | 10/1997 | Greene, Jr. | D20/41 |
| 5,806,905 | A | * | 9/1998 | Moore | B60R 9/00 296/3 |
| 5,820,092 | A | * | 10/1998 | Thaler | F24F 13/32 248/676 |
| 5,862,625 | A | * | 1/1999 | Parker | A01G 9/12 47/70 |
| 5,915,656 | A | * | 6/1999 | Grewe | G09F 15/0062 40/607.1 |
| 5,918,750 | A | * | 7/1999 | Jackson | A47F 5/0807 108/108 |
| 5,971,174 | A | * | 10/1999 | Strock | A47B 87/008 211/186 |
| 6,027,000 | A | * | 2/2000 | Sterzel | B60R 7/02 224/42.33 |
| D421,866 | S | * | 3/2000 | Long | D6/552 |
| 6,038,802 | A | * | 3/2000 | Tidwell | G09F 15/0025 40/610 |
| 6,044,990 | A | * | 4/2000 | Palmeri | A47B 47/0016 403/231 |
| 6,109,625 | A | * | 8/2000 | Hewitt | F16M 11/22 280/43.24 |
| 6,119,384 | A | * | 9/2000 | Fischer | G09F 21/04 40/607.1 |
| 6,161,320 | A | * | 12/2000 | Peterson | G09F 15/0025 40/605 |
| 6,182,740 | B1 | * | 2/2001 | Pfaff | A47G 5/00 160/351 |
| 6,257,552 | B1 | * | 7/2001 | Crow | B66F 3/24 254/2 B |
| 6,536,640 | B1 | * | 3/2003 | Gent | B60R 9/00 224/403 |
| 6,644,484 | B1 | * | 11/2003 | Sardis | A47F 5/137 211/189 |
| 6,659,496 | B1 | * | 12/2003 | Wilson | B60P 3/0252 414/469 |
| 6,694,965 | B1 | * | 2/2004 | Chen | A47J 37/0704 99/393 |
| 6,728,980 | B1 | * | 5/2004 | Chen | A47D 9/02 5/93.1 |
| 6,783,147 | B1 | * | 8/2004 | Green, Sr. | B62B 1/20 D34/12 |
| 6,786,503 | B1 | * | 9/2004 | Young | B62B 3/008 280/35 |
| 6,889,982 | B1 | * | 5/2005 | Gove | A63B 63/00 273/400 |
| 6,944,981 | B1 | * | 9/2005 | Garberg | B62B 3/1472 40/606.03 |
| 7,017,299 | B1 | * | 3/2006 | Speed | A01G 9/12 47/21.1 |
| 7,037,030 | B2 | * | 5/2006 | McLemore | E01F 13/048 404/6 |
| 7,083,055 | B1 | * | 8/2006 | Ambrosat | A63B 71/0036 211/38 |
| 7,341,397 | B2 | * | 3/2008 | Murphy | F16F 7/12 404/6 |
| D604,473 | S | * | 11/2009 | Gibson | D34/16 |
| 7,866,074 | B2 | * | 1/2011 | McComb | B43L 1/08 40/606.01 |
| 7,866,679 | B1 | * | 1/2011 | Leon | B65F 1/1426 280/79.5 |
| 7,963,530 | B1 | * | 6/2011 | Garcia | B62B 3/02 280/30 |
| 8,011,686 | B2 | * | 9/2011 | Chen | B62B 3/106 280/87.01 |
| 8,024,881 | B2 | * | 9/2011 | Redmon | G09F 19/18 40/607.04 |
| 8,149,138 | B1 | * | 4/2012 | Burke | E01F 13/06 340/932.1 |
| 8,181,796 | B2 | * | 5/2012 | DiFazio | B65G 65/00 211/41.14 |
| 8,328,029 | B1 | * | 12/2012 | Binsfeld | B66F 7/02 211/180 |
| 8,342,544 | B1 | * | 1/2013 | Blewett | B62B 3/022 211/195 |

(56) References Cited

U.S. PATENT DOCUMENTS

| | | | | |
|---|---|---|---|---|
| 8,827,232 | B2* | 9/2014 | Crowley | A47B 43/003 |
| | | | | 248/676 |
| 9,038,299 | B1* | 5/2015 | Uribe | E01F 13/02 |
| | | | | 40/610 |
| 9,415,786 | B1* | 8/2016 | Lorrigan | B62B 1/206 |
| D777,483 | S* | 1/2017 | Bittie | D6/681 |
| D804,764 | S* | 12/2017 | Emery | D34/12 |
| D813,787 | S* | 3/2018 | Thomas | D12/414 |
| 10,525,894 | B1* | 1/2020 | Williamson | B62B 3/007 |
| 10,617,069 | B2* | 4/2020 | MacDonald | A01G 9/12 |
| 10,743,680 | B1 | 8/2020 | Weis | |
| 2002/0005389 | A1* | 1/2002 | Guo | B65D 85/185 |
| | | | | 211/85.3 |
| 2002/0084588 | A1* | 7/2002 | Lynch | A63B 67/10 |
| | | | | 473/476 |
| 2003/0140538 | A1* | 7/2003 | Garcia | G09F 21/04 |
| | | | | 40/590 |
| 2004/0124160 | A1* | 7/2004 | Vitale | G11B 33/0461 |
| | | | | 211/40 |
| 2006/0016774 | A1* | 1/2006 | Bustos | A47B 96/025 |
| | | | | 211/186 |
| 2006/0168857 | A1* | 8/2006 | Kim | G09F 17/00 |
| | | | | 40/606.01 |
| 2006/0185206 | A1* | 8/2006 | Du Bose | G09F 7/18 |
| | | | | 40/610 |
| 2006/0283824 | A1* | 12/2006 | Farley | F17C 13/085 |
| | | | | 211/188 |
| 2007/0056920 | A1* | 3/2007 | Fleming | B25H 3/04 |
| | | | | 211/85.5 |
| 2007/0096437 | A1* | 5/2007 | Watson | B62B 3/106 |
| | | | | 280/651 |
| 2007/0131635 | A1* | 6/2007 | Shieh | A47B 47/0058 |
| | | | | 211/189 |
| 2007/0220672 | A1* | 9/2007 | Roberts | A61G 1/0237 |
| | | | | 5/81.1 R |
| 2008/0006596 | A1* | 1/2008 | Palmeri | A47B 47/005 |
| | | | | 211/189 |
| 2008/0307684 | A1* | 12/2008 | Ulloa | G09F 7/18 |
| | | | | 40/607.1 |
| 2009/0026735 | A1* | 1/2009 | Watzke | B62B 1/12 |
| | | | | 280/652 |
| 2009/0184073 | A1* | 7/2009 | Lu | A47G 25/0664 |
| | | | | 211/198 |
| 2009/0278316 | A1* | 11/2009 | LaMarte | A63B 67/06 |
| | | | | 273/343 |
| 2010/0107489 | A1* | 5/2010 | Silver | A01G 9/249 |
| | | | | 47/58.1 R |
| 2011/0133417 | A1* | 6/2011 | Rouillard | B62B 3/02 |
| | | | | 280/638 |
| 2011/0272543 | A1* | 11/2011 | Wojtowicz | A47B 96/145 |
| | | | | 248/218.4 |
| 2012/0007343 | A1* | 1/2012 | Webster | B62B 3/108 |
| | | | | 280/659 |
| 2012/0036751 | A1* | 2/2012 | Wang | G09F 15/0056 |
| | | | | 40/606.01 |
| 2012/0097628 | A1* | 4/2012 | Blacknell | A47G 25/0685 |
| | | | | 211/85.3 |
| 2012/0112425 | A1* | 5/2012 | Hickey | B62B 3/10 |
| | | | | 280/79.3 |
| 2012/0153657 | A1* | 6/2012 | Kapoor | A61G 1/06 |
| | | | | 211/27 |
| 2013/0146553 | A1* | 6/2013 | Preidt | A47F 5/00 |
| | | | | 211/153 |
| 2013/0306808 | A1* | 11/2013 | Huang | A47B 13/06 |
| | | | | 248/163.1 |
| 2014/0083005 | A1* | 3/2014 | Collins | F16M 11/42 |
| | | | | 280/35 |
| 2014/0345176 | A1* | 11/2014 | Okert | G09F 15/005 |
| | | | | 40/607.01 |
| 2014/0353271 | A1* | 12/2014 | Kruse | A47F 5/01 |
| | | | | 211/188 |
| 2015/0289652 | A1* | 10/2015 | Strahinic | A47B 97/00 |
| | | | | 211/85.8 |
| 2015/0344057 | A1* | 12/2015 | Dehmer | F16M 13/022 |
| | | | | 280/33.993 |
| 2016/0000238 | A1* | 1/2016 | Bruegmann | A47F 5/13 |
| | | | | 29/525.08 |
| 2016/0029786 | A1* | 2/2016 | Davis | A47B 91/00 |
| | | | | 211/208 |
| 2016/0055447 | A1* | 2/2016 | Sehmer | A47F 5/137 |
| | | | | 235/385 |
| 2017/0295956 | A1* | 10/2017 | Lin | A47F 5/01 |
| 2018/0025678 | A1* | 1/2018 | Cilliers | G09F 15/0062 |
| | | | | 40/610 |
| 2019/0223628 | A1* | 7/2019 | Hicks | A47B 47/0058 |

\* cited by examiner

PORTABLE ADVERTISING PLATFORMS

FIELD OF THE INVENTION

This present invention relates generally to both fixed and portable advertising platform systems to support promotional signs, media, retail products, mechanical devices and other items in both outdoor and indoor advertising environments. The embodiments disclosed herein reflect improvements to those embodiments shown in U.S. Pat. No. 10,743,680 which hereinafter will be referred to as Prior Art. Differences between these improvements and the Prior Art will be highlighted and explained throughout.

BACKGROUND

Businesses, schools and other entities have long employed the use of signs and other media to attract, inform, and/or direct customers, such as by advertising a special promotion or event, providing directions to a specific location, and so forth. One popular technique is to attach signs to portable A-frames and/or sandwich boards and place them by store fronts or on sidewalks next to busy highways in order to draw the attention of both pedestrians and motorists. A big drawback is the ground must be level to minimize falling over. Also, unless anchored, the wind can often blow over such devices. Further, the size of the sign used is limited to the device's display window and most likely is not large enough to display information effectively. Sign visibility is another drawback because these devices display signs at ground level and not at elevated levels where it is easier to engage the attention of passersby. Finally, most such devices are usually carried inside at night so user fatigue and ease of use are drawbacks. Other techniques include using fixed sign frames embedded in the ground and hanging signs from storefronts itself.

Another market application is hanging and displaying retail products such as clothes and plants both inside buildings and outside by the storefronts. Another market application includes vendor booths at convention centers where promotional signs and literature need to be displayed. One technique is to use wheeled carts that have hanging racks. A big drawback is leveling the cart on uneven ground. Another drawback is the braking mechanism to prevent un-controlled rolling. Most carts have wheels with foot brakes. Such brakes are hard to engage and eventually wear out over time. Maneuverability can be a drawback especially in confined and restricted display areas. Many carts are heavy and have limitations with wheel size plus some of the wheels may not swivel. Other advertising applications include use of electrical signs and mechanical devices requiring access to power sources. They have the same display shortcomings as do signs and retail products.

Therefore, what is needed is an advertising platform that is portable, adjustable, versatile, lightweight, mobile, sturdy and wind resistant and that can easily support and elevate media and products above traffic and over rough terrain and obstacles including ditches and bushes.

SUMMARY

Various embodiments of a portable lightweight advertising platform system for store front, street side and in-door promotions are disclosed herein. This platform can be adapted to support signs, media, retail products, electrical signs, mechanical devices and other. The basic embodiment consists of a lower cart including a wheel assembly and leg levelers supporting an upper web that can have multiple tiers and overhanging arms. All hung items are fastened at their tops only allowing them to freely swing; wind resistant. Double sided versions of the hung items can be used for viewing from opposite directions. The structural members of this platform can stretch extensively both in length, width and height from a compressed configuration for use in a narrow confined area to a wide configuration for use in open space where signs and other items can be elevated above obstacles such as bushes and fences.

Each corner of the lower cart has a leg leveler that can telescope several feet horizontally and vertically to level the cart on rough uneven terrain and over ditches. This telescoping range can be increased by stretching the cart's side frame. The leg levelers also act as sturdy brakes; friction with ground. With no wheel brakes required, there is good clearance between the wheel flange and wheel itself providing an easy to clean and mud resistant feature. The large 8 inch wheels all swivel for easy maneuvering over rough terrain and in confined areas. Being easily detachable, smaller wheels can be swapped out for indoor applications and much larger wheels for outdoors.

The design methodology is based around using a variety of joints that are interconnected with square shaped insert tubes that slide inside the joints. Attached to the joints are thumb screws and when twisted, press against and pinch the insert tubes to produce a snug secure fasten. To make more rugged, some slop or spacing between the joints and insert tubes is designed in, so if any structural members become dirty or damaged, the insert tubes may still slide and still be snuggly fastened using the thumb screws. Connector joints can be used to connect two insert tubes to form a longer member. Where desired, longer connector joints can be used to entirely overlap a particular insert tube effectively doubling the tube's wall thickness and strength. Additional connectors, joints and insert tubes can be attached to form even larger structural members. The overall length of the structural members can also be changed by providing insert tubes of different lengths up to 5 feet or more. Optional attachment arms can be hung to the either side of the platform by inserting extra joints and insert tubes. Because the insert tubes are square, extra joints can be attached and turned 90 degrees relative to the platform allowing additional members to be attached at perpendicular angles. Additional wheels can be added by inserting extra joints in the cart's side frame. These combined design features allows extensive stretching in the X, Y, and Z axis providing numerous platform configurations including a store front version that can roll under doors for message set up after hours.

The platform, being made from plastic or aluminum, is sturdy, rugged, rust proof, lightweight and weighs about 40 pounds without the wheels. The weight depends on the configuration and components used. It has a display and storage capacity of about 300 pounds; 400 and more if reinforced components are used. It can easily be disassembled for storage by simply un-twisting the thumb screws. In some embodiments, other fastening mechanisms or combinations thereof may be used including snap buttons, and bolts with wing nuts. In other embodiments, alternate tube sizes, joint sizes, and joint configurations may be optionally used. In some embodiments, other materials such as composites might be used. In other embodiments, the platform's components and members may be coated with a reflective paint or powder coat where the reflection and bright colors can help gain the attention of passersby. In some embodiments, the platform may be modified to carry a portable power supply to power any electronics associated with signs, mechanical devices or retail products.

The Prior Art in U.S. Pat. No. 10,743,680, stressed welding aluminum tubes together to form the joints and then welding aluminum nuts to the joints for the thumb screws. In this new embodiment, all the joints can now be made from plastic injection molds where inset in the injection process are threaded inserts for the thumb screws. The plastic can be colored during the injection process whereas aluminum would have to be separately powder coated or painted. In the Prior Art, the cart's side frame was welded together into one piece. In this new embodiment, the side frame can now be assembled into numerous configurations using the joints and insert tubes and can be stretched significantly. Three or more side frames can now be interconnected to reinforce and further stretch the platform horizontally. Additional structural mounts can easily be added to the side frame for the upper web, leg levelers, and extra wheels. The Prior Art stressed using 1 inch×1.5 inch rectangular tubing. In this new embodiment, square tubing is used allowing the joints to rotate 90 degrees around the insert tubes providing stretching in the X, Y and Z axis. The enhanced concepts in this new embodiment will also translate into substantially lower manufacturing and inventory costs.

BRIEF DESCRIPTION OF THE DRAWINGS

The concepts, features, methods, and component configurations briefly described above are clarified with reference to the accompanying drawings and following detailed descriptions. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the inventions.

FIG. 1 is an elevation view of an example embodiment of the portable advertising platform that stretches substantially both horizontally, vertically and in width. The platform can be made from plastic or aluminum and consists of a lower cart supporting an upper web. The 4 leg levelers on the corners of the cart telescope several feet both horizontally and vertically to level the platform on uneven terrain. Levelers also act as sturdy brakes by using friction with the ground surface. Detachable large 8 inch wheels swivel for easy maneuvering. All supported signs and products are attached only at their tops which allow them to freely swing; wind resistant. Additional tiers and overhanging arms can be added to the top of the web. The platform's structure consists of a variety of joints interconnected by square shaped insert tubes. Thumb screws attached to the joints provide the fastening. To illustrate this assembly concept, shown at the top of FIG. 1 is an expanded view of a connector joint. Tubes come in multiple lengths up to five feet or more and can couple together.

FIGS. 2A-8 illustrate all the joints used in the FIG. 1 platform. All joints can be made from plastic injection molds or aluminum tubes welded together.

FIG. 2A illustrates how joints are made using aluminum tubes. Shown is a connector joint made from a larger host tube with threaded nuts welded to it. To fasten, inserted into the nuts are thumb screws that when twisted pinch the shown insert tube. Also shown are the "not-to-exceed" markings when connecting the insert tubes to the joints.

DETAILED DESCRIPTION OF THE DRAWINGS

In the following paragraphs, the present embodiments will be described in detail by way of example with reference to the attached drawings. Throughout this description, the preferred embodiment and examples shown should be considered as exemplars, rather than as limitations on the present embodiments.

Figure 1:
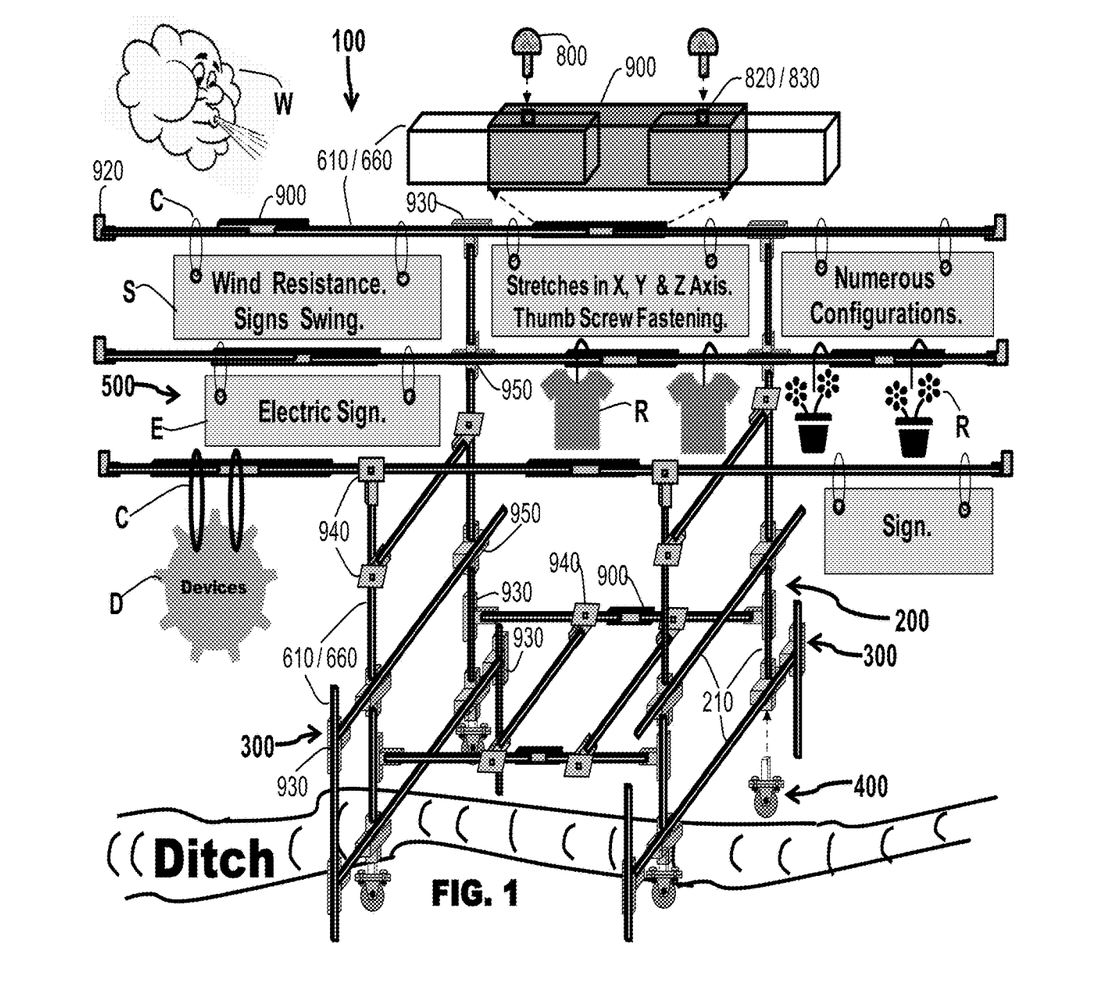

FIG. 1 illustrates an embodiment of the advertising platform 100 having an adjustable upper vertical web 500 mounted on top of a cart 200 with a wheel assembly 400 and a retractable leg leveler assembly 300. All media, devices and retail products are fastened only loosely at the top of web 500 so they can freely swing with the wind W minimizing aerodynamic forces. The primary structural concept is based around a variety of joints that are interconnected by insert tubes. Thumb screws attached to the joints provide an easy-to-use secure fastening mechanism. To illustrate, shown at the top of FIG. 1 is an expanded view of a connector joint 900. Icons for the thumb screws 800 are not shown in FIG. 1, and FIGS. 12-18.

Insert tubes 610/660 are square shaped providing the capability to rotate extra joints 90 degrees to mount perpendicular members in the X, Y and Z axis. This capability was not in the Prior Art which used rectangular tubes that could only rotate 180 degrees. Additionally, with square tubing, all 4 sides can be used to minimize wear on the insert tubes from constant pinching. In the Prior Art, only 2 sides could be used. Stretching occurs by adding extra joints and longer insert tubes 610/660. Extra joints added to cart 200's side frame 210 can increase the number of vertical mounts that anchor the upper web providing numerous configurations including a store front version that rolls under doors for set up indoors after hours. These same extra joints can be used to mount extra wheel assemblies 400 creating a larger reinforced cart 200 with 6 wheels or more. Using joints to assemble side frame 210 into many configurations is a significant new feature not in the Prior Art where the side frame was welded together into a single piece.

The four leg levelers 300 can stretch several feet both vertically and horizontally providing the ability to level the entire platform 100 on the most uneven terrain including over ditches. Levelers 300 can further stretch by using longer insert tubes 610/660 and extra joints. Levelers 300 can be reinforced by adding a second "T" joint 930 above the primary "T" joint 930 as shown in the bottom left of FIG. 1. This capability was not in the Prior Art which used only one "T" joint 930 as shown in the bottom right of FIG. 1. To operate leg leveler 300, the user lifts each side of the cart until level, then un-twists the thumb screws 800 allowing the insert tubes 610/660 to freely drop to the ground. The user then twists the thumb screws 800 to fasten. Using friction with the ground surface, these leg levelers 300 also act as sturdy and durable brakes. The wheels in assembly 400 are 8-inch diameter, have no brakes, are mud resistant, and can swivel 360 degrees for easy maneuvering especially in confined areas. Because wheel assembly 400 is thumb screw attached, the wheels can easily be swapped out with smaller and larger sizes using standard stocked items in local stores.

As shown in FIG. 1, platform 100 can support a variety of retail products R such as clothes and plants plus a variety of media and signs S including double sided versions for viewing in opposite traffic directions. Electric signs E and mechanical devices D including batteries can also be displayed. Except for the wheels, fasteners and connectors C, all of platform 100's components are plastic or aluminum, providing a sturdy, stable, and lightweight platform. Platform 100 without the wheels, weighs about 40 pounds depending on the configuration and components used. If desired, bricks can be used as anchors. Platform 100 has a display capacity of about 300 pounds; 400 and more if reinforced components are used. In other embodiments, heavier hanging loads can be supported by using extra joints and insert tubes 610/660 with a thicker wall thickness.

Figure 2A:
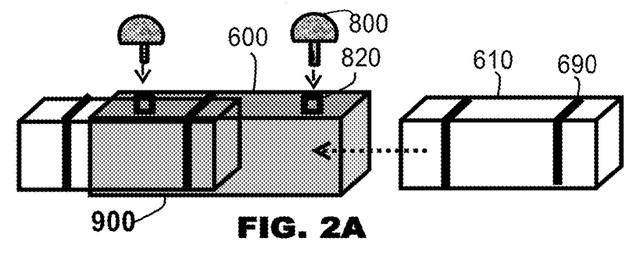

FIGS. 2A-8 illustrate all the joints and insert tubes that can be used in platform 100. All joints can be made from plastic injection molds or aluminum tubes that are welded together. Platform 100 has numerous configurations depending on the quantities of joints, insert tubes and tube lengths included in any customer kit. FIG. 2A illustrates how joints are made using the aluminum tube concept. Shown as an example is connector joint 900 which is made from a larger host aluminum tube 600. The smaller aluminum insert tube 610 easily slides inside the larger host tube 600. An aluminum nut 820 is welded to both ends of host tube 600 plus any other joints made from aluminum tubes. These nuts 820 are centered on a hole (not shown) into which is received a threaded thumb screw 800 or fin bolt. As the thumb screw 800 is twisted, it presses against and pinches insert tube 610. This pinching action provides a secure and snug, fastening mechanism. Embedded on both ends of insert tube 610 are "not-to-exceed" telescoping markings 690. If stretched beyond the markings, the insert tube 610 may have slid too far and thumb screw 800 could miss it. All thumb screws 800 and corresponding nuts 820 are located 2 inches from the end of host tube 600 and every connecting joint's branches. The 690 markings are located 3 inches from both ends of insert tube 610. The net effect is a 1-inch overlap buffer is created for thumb screw engagement. In some embodiments, other fastening mechanisms, or combinations of other fastening mechanisms, may be used including snap buttons, bolts with wing nuts, and so forth.

Figures 2B, 3B:
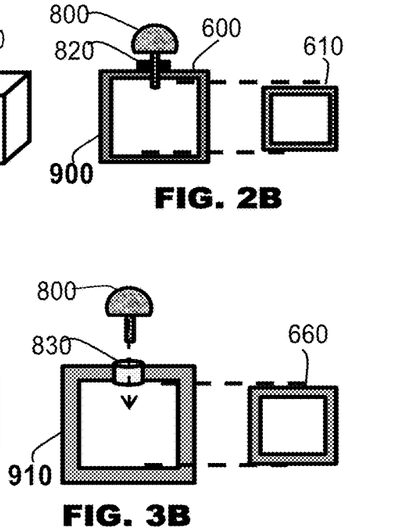
FIG. 2B is a side view of the 2 tubes shown in FIG. 2A. Both tubes are square shaped.
FIG. 3B is a side view of both the joint and insert tube shown in FIG. 3A. Being made from plastic, both the joint and insert tube have a thicker wall thickness than the aluminum tubes shown in FIG. 2A. The joint's inside cavity or opening plus the insert tube are both square shaped.

FIG. 2B is a side view of the aluminum tubes 600 and 610 shown in FIG. 2A. The larger host tube 600 has a square cross section of 1.25"×1.25" with a wall thickness of 0.045". Smaller insert tube 610 has a square cross section of 1.07"×1.07" and a wall thickness of 0.045". In other embodiments, the tube strength can be increased by using tubes with a heftier wall thickness. As illustrated by the dashed lines in FIG. 2B, there is some designed in slop or space between tubes 600 and 610 so if any become dirty or damaged, insert tube 610 can still slide and be snuggly fastened to host tube 600 using the thumb screw mechanism. In some embodiments, the aluminum tube sizes, dimensions, and wall thickness may change but the concept of one tube sliding inside the other remains the same.

Figure 3A:
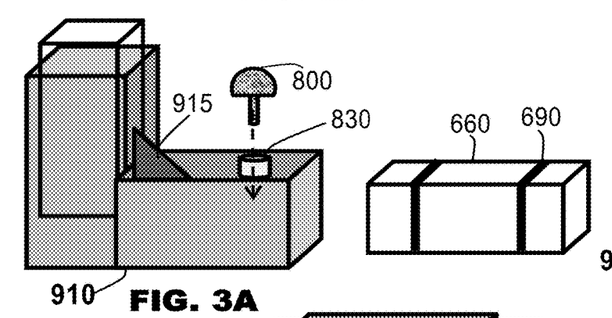
FIG. 3A illustrates how joints are made using plastic injection molds where threaded inserts for the thumb screws are added in during the injection process. Shown is an elbow joint that has a molded rib for extra strength. Also shown is an insert tube made from extruded plastic.

FIG. 3A illustrates how joints are made using plastic injection molds where inset during the injection process are threaded inserts 830 for the thumb screws 800. Shown as an example is elbow Joint 910 which can take on many shapes as long as the opening or cavity is square shaped to receive the insert tube 660 which is square shaped. Joint 910 has an optional rib 915 attached in the molding process to provide added strength. FIG. 3B is a side view of both joint 910 and insert tube 660 shown in FIG. 3A. To provide extra strength, both joint 910 and insert tube 660 have a thicker wall thickness than the aluminum tubes shown in FIGS. 2A and 2B. Using plastics has the same tube sliding criteria as aluminum including the positioning of thumb screws plus spacing between joints and insert tubes. Though referenced in the Prior Art as an alternative material, using plastics is now the preferred material because of reduced costs and improved cosmetics. Additionally, colors can be incorporated during the molding process whereas with aluminum, a colored powder coat would have to be separately applied. In some embodiments, plastics could be used to make the joints and aluminum used for the insert tubes. In another embodiment, aluminum could be used to make longer connector joints 900 which can overlay almost all of an insert tube's length effectively doubling the tube's wall thickness and strength.

Figures 4, 5:
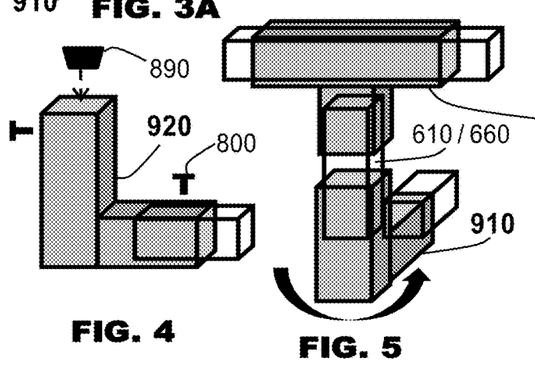
FIG. 4 is an oblique view of an end joint with a plastic insert to cap the joint.
FIG. 5 illustrates how joints can be rotated 90 degrees around square shaped insert tubes to provide perpendicular members in the X, Y and Z axis.
Figure 6:
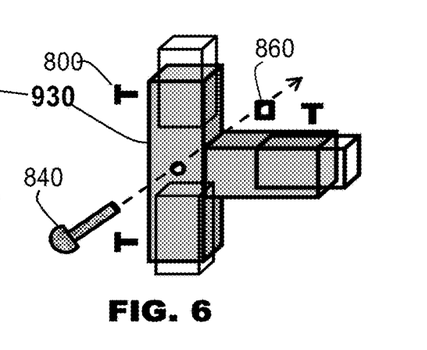
FIG. 6 is an oblique view of a "T" joint that optionally includes a hole for a bolt which is used as a stop when connecting insert tubes.
Figure 7A:
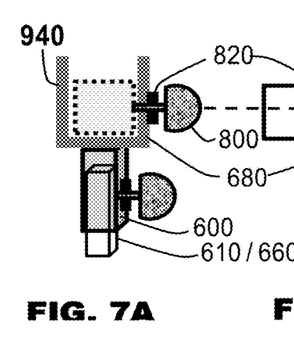
FIGS. 7A and 7B are side and front views of a clamp joint which was labeled as a "U" joint in the Prior Art.
Figure 7B:
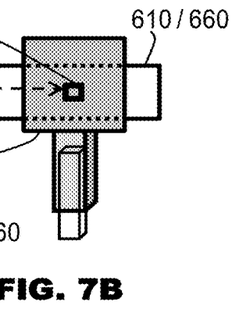
Figure 8:
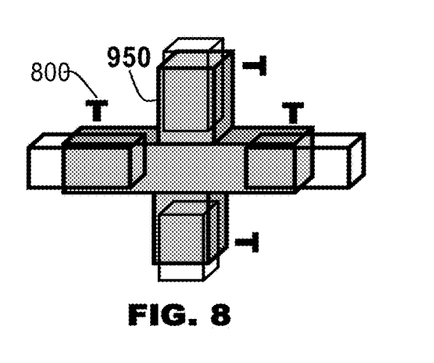
FIG. 8 is an oblique view of a cross joint.

Shown in FIG. 4 is end joint 920 which helps prevent supported items from sliding off any overhanging members. Plastic insert 890 is pressed into joint 920 to cap it from dirt and moisture. FIG. 5 illustrates how joints can be rotated 90 degrees around square shaped insert tubes to mount perpendicular members in the X, Y and Z axis. FIG. 6 shows "T" joint 930 that includes an optional drilled hole for bolt 840 and wing nut 860 which are used as a stop when connecting insert tubes. FIGS. 7A and 7B are side and front views of clamp joint 940 which is used on the top of the upper tier in web 500 plus in horizontal support members throughout platform 100. Insert tubes 610/660 plus connector joint 900 sit inside the "U" shaped channel 680 of clamp joint 940 and are fastened using thumb screws 800. FIG. 8 is an oblique view of a cross joint 950.

Figures 9, 10A, 10B, 10C, 10D:
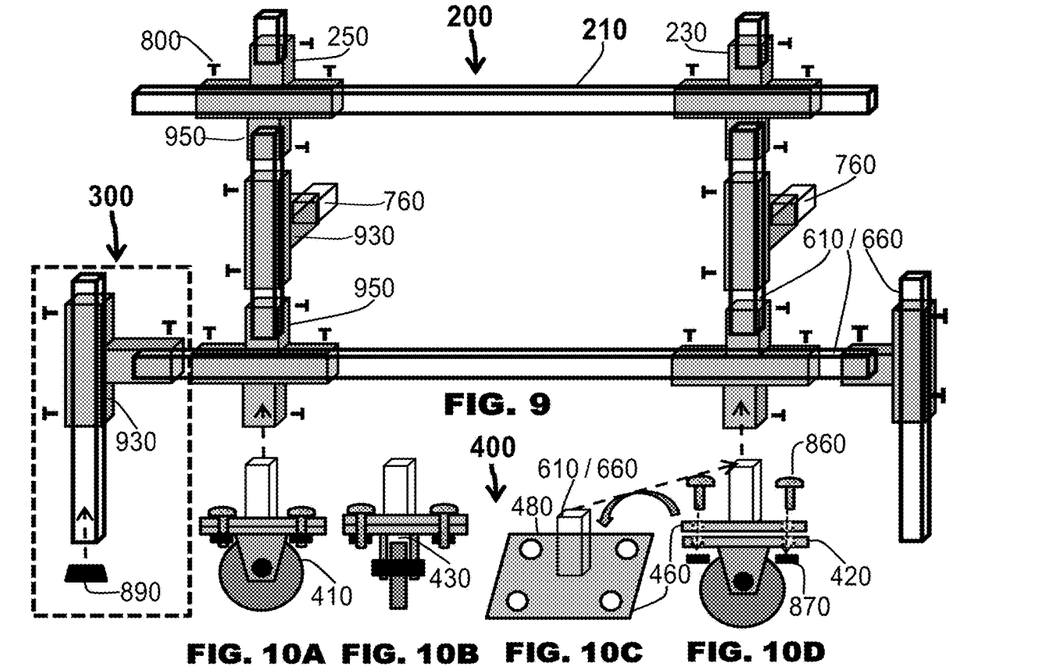
FIG. 9 is an oblique view of the cart's side frame and leg levelers shown in FIG. 1.
FIGS. 10A, 10B, 10C and 10D are oblique views of the wheel assembly shown in FIG. 1.
Figure 12:
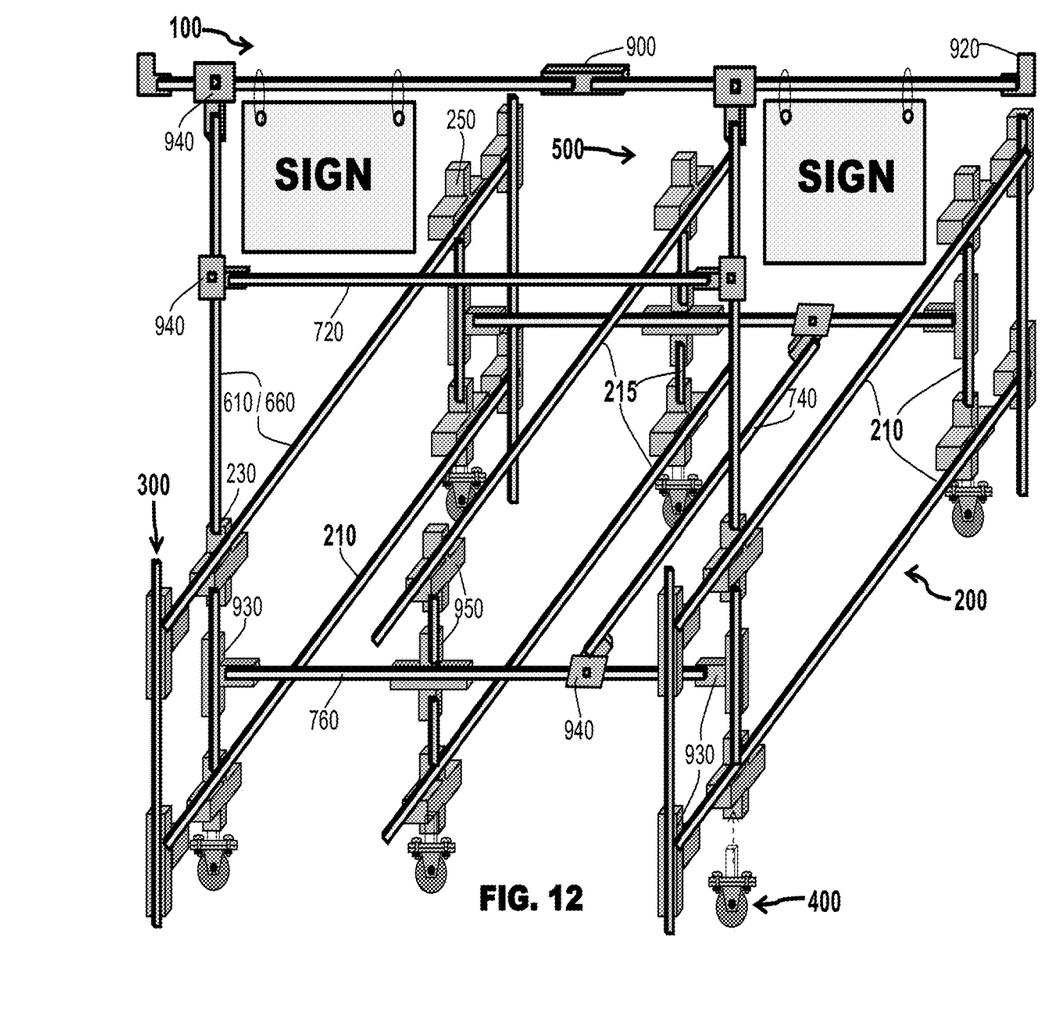
FIG. 12 is an expanded front view of one platform configuration where a $3^{rd}$ side frame is added to reinforce and further stretch the platform horizontally. The upper web is only mounted at the front and clamp joints are used to mount horizontal members from which media is hung.

FIG. 9 is a perspective view of cart 200's side frame 210 and leg levelers 300. In this basic embodiment, side frame 210 consists of 4 cross joints 950 that are interconnected by 4 insert tubes 610/660 into a rectangular configuration. The top branch of the 2 upper cross joints 950 are used as front mount 230 and back mount 250 to anchor the upper web 500. The bottom branch of the 2 lower cross joints 950 are used to mount wheel assemblies 400. Two "T" joints 930 are rotated 90 degrees around the 2 vertical connecting insert tubes to provide perpendicular mounts for 2 brace members 760 used to connect 2 side frames 210 to form cart 200. The 2 horizontal insert tubes slide completely through the upper and lower cross joints 950 to finish assembly of side frame 210. These horizontal tubes then connect to the "T" joints 930 in leg levelers 300. Using joints and insert tubes to assemble side frame 210 is a significant new feature not in the Prior Art where the side frame was welded together into a single piece. In another embodiment and as shown in FIG. 12, three or more side frames can be connected by using cross joints 950 as perpendicular mounts in the middle side frames 215. This capability was not in the Prior Art where only 2 side frames can be connected.

Figure 11:
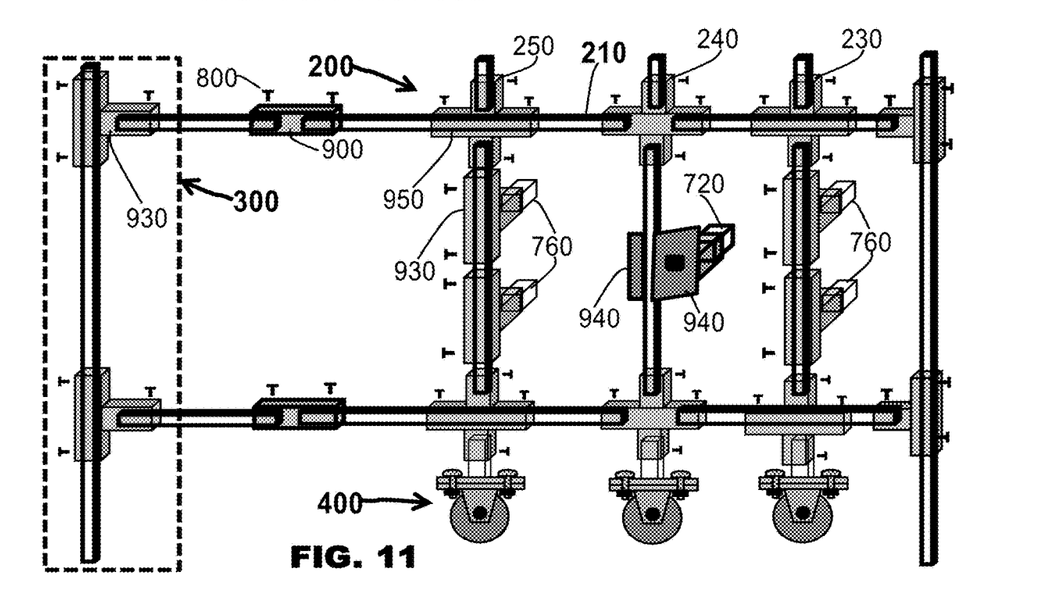
FIG. 11 illustrates one side frame configuration using a third set of cross joints to stretch the width and add extra vertical mounts for both the upper web and extra wheels. Also shown is an extra "T" joint to reinforce the leg leveler.

The primary leg leveler 300 shown in FIG. 9 consists of a vertical insert tube 610/660 and one "T" joint 930 mounted to the bottom of side frame 210. As shown in FIG. 11, a second "T" joint 930 is mounted to the top of side frame 210 to reinforce leg leveler 300. The vertical insert tube 610/660 then slides through both "T" joints 930. This reinforcement capability was not in the Prior Art which used only a singular primary version. To use the levelers, simply lift one side of cart 200 until level, and then un-twist the thumb screws 800 on that side's 2 leg levelers 300 allowing the vertical insert tubes 610/660 for both levelers to freely drop to the ground. Then twist the thumb screws 800 to secure and fasten. Because the entire platform 100 is lightweight, the effort required by the user to lift each side of cart 200 is minimal. With leg levelers 300 being able to stretch several feet both vertically and horizontally, provides the capability to level platform 100 on the most uneven terrain and over obstacles such as ditches and bushes.

These leg levelers 300 also act as brakes when one or more wheel assemblies 400 are lifted off the ground. The brake mechanism is the friction between the levelers' insert tubes 610/660 and the ground. This mechanism is far more effective than wheel brakes which can clog, slip and fail with extended usage; safety issues with possible uncontrolled rolling. Wheel brakes also have to be set by a person's foot which can be difficult and cumbersome. The leg levelers 300 are very durable because any dirty or damaged tubes can still be used because of the built in spacing or slop between the joints and smaller insert tubes. The levelers are also easy to clean and if desired, easily replaced. For indoor use and as shown in FIG. 9, plastic tube inserts 890 can be pressed into the vertical insert tubes to minimize scratching of floors.

FIG. 10A shows a completed wheel assembly 400 and FIG. 10B shows the side view. As shown in FIG. 10B, wheel 410 has a diameter of 8-inches and can swivel 360 degrees for easy maneuvering especially in confined areas. Wheel 410 has no brakes, comes attached to a flange 420 where the space 430 between them is considerable making the assembly more mud resistant, subject to less ware and easier to clean. As shown in FIG. 10C, wheel insert 460 consists of insert tube 610/660 attached to flange 480. Flange 480 has a drilled hole pattern to match that on wheel flange 420. As shown in FIG. 10D, bolts 860 and lock nuts 870 are used to fasten wheel insert 460 to wheel flange 420 to make wheel assembly 400. The protruding insert tube 610/660 on wheel assembly 400 then slides inside the underside of side frame 210 and is then secured using thumb screw 800. Wheel assemblies 400 have a limited telescoping capability using thumb screws 800 so all the wheels can be leveled when rolling the platform. With assembly 400 being easily detachable, a variety of wheel sizes can be swapped out by the user including smaller sizes for a storefront application and larger sizes for traversing over rough terrain.

In a different embodiment as shown in FIG. 11, additional joints and insert tubes can be attached to not only stretch side frame 210, but also provide extra vertical mounts 240. Also shown is using 2 extra "T" joints 930 and associated 2 extra brace members 760 to reinforce cart 200 plus providing sides to any optional shelf cover; not in the Prior Art. Clamp joint 940 is added for mounting brace member 720 to further reinforce brace members 760. To reinforce leg leveler 300, an extra "T" joint 930 is added above the primary "T" joint 930; not in the Prior Art. Also shown are connector joints 900 to stretch leg leveler 300 horizontally away from side frame 210, so as to level cart 200 over wide obstacles such as ditches. Extra wheel assemblies 400 are optionally attached to provide for easier rolling and to reinforce cart 200. In other embodiments, both joints and tubing with thicker walls can be used to further increase strength.

Shown in FIG. 12 is an expanded front diagonal view of one embodiment of platform 100 which has a third side frame 215 interconnected to reinforce and further stretch cart 200 horizontally. Mounted in the middle of side frame 215 is cross joint 950 which allows brace member 760 to completely slide through and connect all 3 side frames. This capability of interconnecting 3 or more side frames lengthwise was not in the Prior Art. Brace members 720 and 740 which use clamp joints 940, are optionally used to reinforce platform 100. Any brace member consists of a single insert tube 610/660 or a plurality insert tubes interconnected by connector joints 900 to form a longer brace member. As shown FIG. 12, two "T" joints 930 are used to reinforce leg levelers 300. Extra leg levelers can be attached to side frame 215; not in the Prior Art.

Using FIG. 12 as a guide, step 1 to assemble platform 100 is to configure one side frame 210 and then duplicate it. Step 2 is to form 2 brace members 760 to the desired width and then interconnect the side frames using these members. Step 3 is to fasten one or more brace members 740 between brace members 760 to reinforce the structure plus create a frame for a shelf. Step 4, if desired, is to attach one or more brace members 720 to reinforce cart 200 and upper web 500. Cart 200 is now assembled. Step 5 in assembling platform 100 is to insert the wheel assemblies 400 into cart 200. Step 6 is attaching leg levelers 300 to cart 200. Step 7 is to attach the upper web 500 to cart 200. To start, configure brace members to the desired vertical height and then as shown in FIG.

11, insert one end into the front, middle or back vertical mounts 230, 240, and 250 on side frames 210. Fasten using the thumb screws 800 on side frames 210. Then attach the appropriate connection joints to the top end of these vertical brace members. Then attach the horizontal brace members between these connection joints. This squares up web 500 which further strengthens the entire platform 100.

The upper web 500 can take on a variety of configurations using combinations of multiple mounts, joints, and insert tube lengths. To add extra tiers, cross joint 950 is used. For a squared look, use both the front and back vertical mounts 230 and 250 and reinforce with brace members using clamp joint 940. For overhanging members and as shown in FIG. 12, clamp joint 940 is used.

Figures 13, 14:
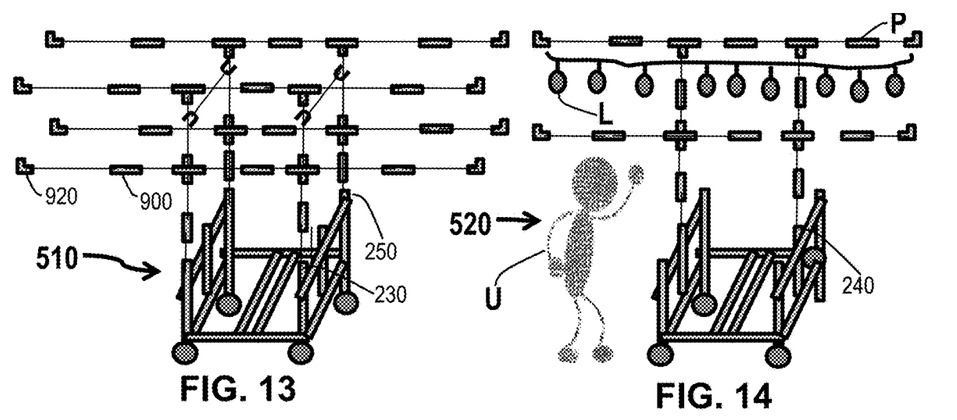
FIG. 13 illustrates one platform configuration with two squared tiers and overhanging arms using the cart's front and back vertical mounts.
FIG. 14 illustrates one platform configuration using the center vertical mounts to support two single tiers in the upper web. Woven light strings and reflective bright paint on the upper tier helps to attract attention of passersby. The user can easily maneuver the platform to the optimal promotional position.

FIGS. 13-18 illustrate the capabilities and samplings of numerous configurations of platform 100. Not shown is platform 100's capability of using double sided signs and media for simultaneous viewing in opposite directions. FIG. 13 illustrates configuration 510 with two squared tiers and overlapping arms using cart 210's front and back mounts 230 and 250. One application is displaying retail products such as clothes on all sides of configuration 510. FIG. 14 illustrates configuration 520 using center mounts 240 to support two single tiers in upper web 500. The user U can easily maneuver the platform to the optimal promotional position. Lights and/or light strings L can be wrapped around upper web 500 to illuminate platform 100. In another embodiment and as shown in FIG. 14, all of platform 100's components can be coated with a reflective paint or powder coating P where the reflection and bright colors can help to gain the attention of passersby.

Figures 15, 16:
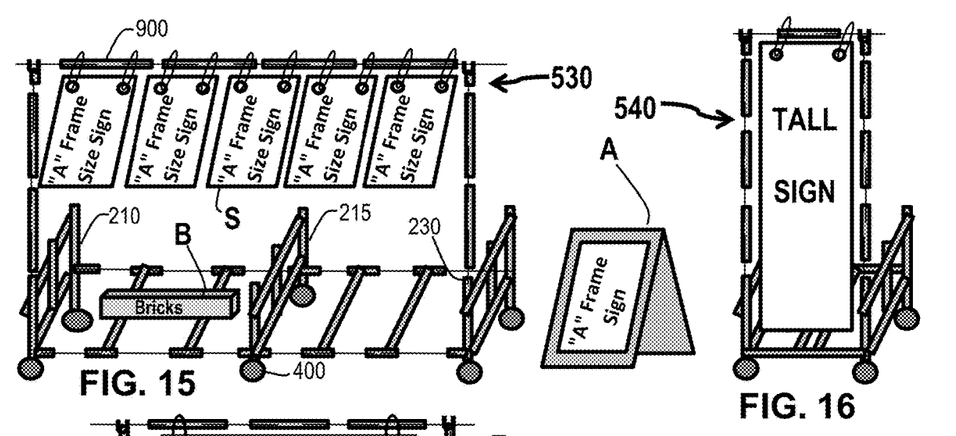
FIG. 15 illustrates a substantially stretched configuration to handle many elevated signs mounted at the front. A $3^{rd}$ side frame is added to the configuration to increase strength and add extra wheels. Bricks can optionally be used as anchors. A typical competitive "A" frame or sandwich board provides some scale to compare.
FIG. 16 illustrates a compact configuration for use in a limited display area.

FIG. 15 illustrates a substantially stretched horizontal configuration 530 using front mount 230 to display many signs S at an eye level elevated position. To increase the overall strength, longer connector joints 900, an extra side frame 215, and 2 extra wheel assemblies 400 are configured in. Adding extra side frames is a new feature not in the Prior Art. Bricks B can optionally be used as anchors. A typical competitive "A" frame A or sandwich board provides some scale to compare. Besides having a much larger display area than frame A, platform 100 can easily be maneuvered while frame A has to be carried by users. Another frame A limitation is level ground is needed to prevent falling over especially by wind. In comparison, platform 100 is wind resistant and can be leveled on the most uneven terrain using leg levelers 300. FIG. 16 shows a compact configuration 540 for use in a confined display area but with sufficient air space to hang a narrow but tall sign.

Figure 17:
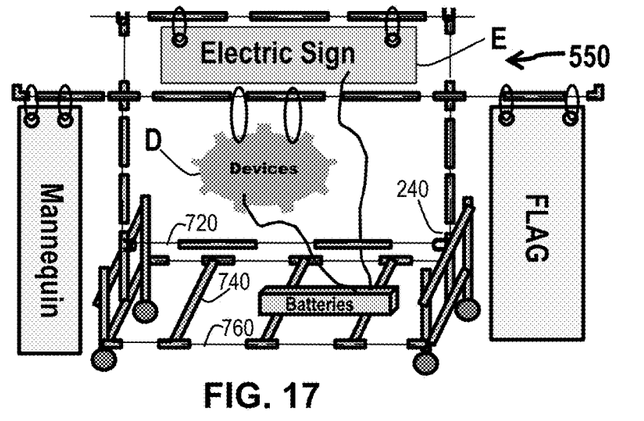
FIG. 17 illustrates a stretched configuration displaying a variety of media including electric sign, mechanical device, mannequin and flag. Batteries can easily be placed on the platform's cross braces.
Figure 18:
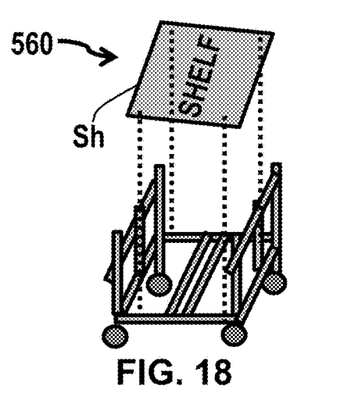
FIG. 18 illustrates attaching a cover to the cart to create a shelf.

FIG. 17 shows a stretched configuration 550 using center mount 240 to display electric sign E, mechanical device D plus mannequins and flags. To increase strength, horizontal brace member 720 is attached using clamp joints 940. Batteries can easily be placed on cart 200's brace members 740 and 760. In a different embodiment, configuration 560 in FIG. 18 illustrates attaching a cover module Sh to form a shelf. In other embodiments, customers may opt to fasten their own shelf covers made from plywood, corrugated board or other.

All signs, media, devices and retail products are fastened only loosely at the top of upper web 500 so they can freely swing with the wind W minimizing aerodynamic forces. Attachment connectors C include zip-ties, cords, clips and so forth. The preferred material for signs S should be rigid, lightweight, and weather-proof such as laminated board and corrugated plastic. A reflective sign surface such as using reflective paint helps in gaining the attention of passersby.

All though not required to all embodiments, platform 100 is of multi-piece construction with few parts and most being common. This may result in lower manufacturing and storage cost. Further, providing platform 100 components in a compact customer kit to be assembled by a user may reduce shipping costs. Also, custom reader boards may be offered that include grommets for easy attachment to platform 100. These boards have grommets on all four corners so that they can be connected with other reader boards to increase overall sign size. All platform components and reader boards nest well in the same shipping container that meets requirements for inexpensive air freight with home delivery.

It will be apparent to those skilled in the art that various changes in form and detail may be made to the present invention without departing from the spirit and scope of the invention. The present invention is intended to embrace all such alternatives, modifications and variances that fall within the scope of the appended claims.

I claim:

1. A modular and portable advertising platform system to support indicia-bearing media, retail products, mechanical devices and other items with the platform system comprising:
    a generally rectangular cart comprising side frames, a front, a rear, a plurality of vertical mounts, a plurality of joints, a plurality of insert tubes and brace members that attach to the joints, so that the cart is adjustable both in length, width and height with numerous configurations, wherein the side frames each comprise opposite sides;
    detachable wheel assemblies that are telescopically coupled to corresponding vertical mounts on the cart to level the cart in preparation for rolling and wherein each wheel assembly can be optionally replaced with a smaller wheel for indoor use and a larger wheel for rough terrain;
    leg levelers coupled to corresponding members of the opposites sides of the side frames, wherein each leg leveler comprises one or more interconnecting joints, one or more horizontal insert tubes to connect the joints to the opposites sides of the side frames, and a vertical insert tube wherein the leg levelers are slidably adjustable both vertically and horizontally to level the platform system on an uneven ground surface wherein by using friction with the ground surface can provide a durable brake mechanism after the wheel assemblies are lifted off the ground surface, wherein the leg levelers extend beyond the front end and the rear end of the cart; and
at least one upper web which provides the mounting sites for the indicia-bearing media, retail products, and mechanical devices wherein the at least one web is comprised of a plurality of interconnecting joints attached to a plurality of vertical insert tubes, and a plurality of horizontal insert tubes and wherein each upper web is adjustable both in length, width and height with numerous configurations including multiple tiers and overhanging arms.

2. The platform system of claim 1, wherein each brace member is comprised of either a single insert tube or a plurality of insert tubes of varying lengths that are interconnected by connector joints to form a longer brace member.

3. The platform system of claim 1, wherein the insert tubes are square shaped and wherein the joints have square shaped openings and/or cavities allowing the square shaped insert tubes and the brace members to slide inside the joints and wherein the joints can either be fabricated from larger tubes than the insert tubes or injection molds that include ribs.

4. The platform system of claim 3, wherein the square shaped joints are configured to be rotated in 90 degree increments around the square insert tubes to provide mounts for the brace members in several perpendicular directions along an X, Y and Z axis.

5. The platform system of claim 3, wherein the joints are further comprised of a fastening mechanism consisting of thumb screws inserted within each joint and when twisted, press against and pinch corresponding insert tubes and brace members to produce a snug, secure fasten.

6. The platform system of claim 5, wherein each insert tube has markings at distal ends of each insert tube respectively to indicate not to slide any further when attaching the insert tubes to the joints.

7. The platform system of claim 3, wherein there is space between the joints and insert tubes to allow the insert tubes to freely slide even if dirty or damaged and then be snuggly fastened using the thumb screws.

8. The platform system of claim 1, wherein each side frame is comprised of a plurality of joints interconnected by a plurality of insert tubes providing numerous configurations and is comprised with a plurality of vertical mounts for the upper web, the leg levelers and wheels assemblies.

9. The platform system of claim 1, wherein at least one additional side frame can be connected to each of the side frames respectively to lengthen and strengthen the platform in a horizontal plane.

10. The platform system of claim 1, wherein each detachable wheel assembly comprises a wheel attached to a flange that is bolted to an insert assembly which has an insert tube that slides into an underside of a corresponding vertical mount on a corresponding side frame and is secured by a thumb screw on the corresponding side frame.

11. The platform system of claim 1, wherein each upper web is configured to be attached to the cart by inserting corresponding vertical insert tubes of each upper web into corresponding vertical mounts on the side frames.

12. The platform system of claim 1, wherein, when in use, the indicia-bearing media, retail products, and mechanical devices include zip-ties, cords, or clips attached to top portions thereof to suspend and freely swing the indicia-bearing media, retail products, and mechanical devices from the brace members of each upper web.

13. The platform system of claim 1, wherein the joints, the insert tubes, and the brace members are made from at least one of the following materials: plastics, aluminum, composites and/or combinations thereof.

14. The platform system of claim 1, wherein corresponding joints and corresponding insert tubes and the brace members are connected by a fastening mechanism including at least one of thumb screws, snap buttons, and bolts with wing nuts.

15. The platform system of claim 1, wherein the joints and the insert tubes can have various tubing sizes, dimensions, wall thicknesses, lengths and/or combinations thereof.

16. The platform system of claim 1, wherein a portable power supply to power lights and other electronics are configured to be attached to the platform.

17. The platform system of claim 1, wherein the joints can be made from plastic injection molds in many configurations and thicknesses including ribs for reinforcement and threaded insert holes for thumb screws.

18. The platform system of claim 1, wherein the joints are configured to be made by welding tubes together and threaded nuts for thumb screws.

19. The platform system of claim 1, wherein the insert tubes can have a plurality of wall thicknesses and can be made from a plurality of materials.

* * * * *